United States Patent [19]

Rich

[11] Patent Number: 4,930,492

[45] Date of Patent: Jun. 5, 1990

[54] SOLAR WATER HEATING SYSTEM

[76] Inventor: Albert C. Rich, 12811 Bexhill Ct., Herndon, Va. 22071

[21] Appl. No.: 367,017

[22] Filed: Jun. 16, 1989

[51] Int. Cl.⁵ .............................................. F24J 2/40
[52] U.S. Cl. ..................................... 126/420; 126/422; 126/435; 126/450; 137/533.11
[58] Field of Search ............... 126/420, 422, 450, 435, 126/436, 400, 416, 448; 137/533.11, 533.21

[56] References Cited

U.S. PATENT DOCUMENTS

| | | | |
|---|---|---|---|
| 4,027,821 | 6/1977 | Hayes et al. | 126/420 |
| 4,237,862 | 12/1980 | Embree | 126/420 |
| 4,307,707 | 12/1981 | Stewart | 126/420 |
| 4,381,816 | 5/1983 | Granetzke et al. | 126/420 |
| 4,621,679 | 11/1986 | Byers et al. | 126/420 |

Primary Examiner—James C. Yeung
Attorney, Agent, or Firm—Finnegan, Henderson, Farabow, Garrett & Dunner

[57] ABSTRACT

A solar water heating system comprising a solar energy collector which comprises a solar energy absorber communicating with a fluid distribution manifold, a drainback tank communicating with the distribution manifold for collecting drainage fluid from the distribution manifold, a pump activated by a differential controller, and a heat exchanger within a water storage tank. The distribution manifold comprises a floating valve header which seals the manifold during fluid feed and allows air to pass during non-active periods.

15 Claims, 3 Drawing Sheets

SOLAR WATER HEATING SYSTEM

BACKGROUND OF THE INVENTION

1. Field of the Invention

The present invention relates to an improved solar water heating system and related water supply and return manifold system employing a floating valve.

2. Description of the Prior Art

The sun is a source of clean, cheap and abundant energy. Greater use of solar energy helps to conserve natural resources and preserve the natural environment.

The benefits of using solar energy have captured and spurred the imagination of many to develop systems to harness solar energy. The most common systems which have been developed are heating systems, and particularly, water heating systems. Examples of systems which have already been developed include those systems disclosed in, for example, U.S. Pat. Nos. 4,257,479; 4,324,228; 4,326,499; 4,381,816; 4,399,808; 4,409,959; 4,483,320; and 4,562,828.

There are many reasons why solar water heating systems should be popular. Most notable of which are the inherent cost effeciency and environmental benefits. Additionally, the solar heated water can be either used immediately or stored for later use. Heated water can also be used directly, e.g., for heating swimming pools, washing, as well as indirectly, e.g., for space heating via heat extraction.

Most, if not all, currently available solar water heating systems, however, are mechanically complex and impractical for domestic or residential use. Not only do they pose manufacturing, production and installation problems, but they also suffer from intensive parts and personal service maintenance requirements. Additionally, currently available solar water heating systems require a high initial investment cost, and this investment cost can only be recouped from savings in heating costs over many years of consistent use. Accordingly, although current pollution problems and increases in fuel prices have prompted a strong demand for a cost-effective solar water heating system for residential applications, the currently available systems, which are complicated, expensive, difficult to install, aesthetically unattractive, and susceptable to freezing conditions are not able to fulfill that demand.

One of the problems which has plagued the development of solar water heating systems is the dilemma of designing a circulation system which provides for efficient heat transfer without fluid flow blockage and/or fluid line breakage while protecting against freezing temperatures. Many approaches have been made to solve these problems. However, most of these approaches have produced complex mechanisms which not only have high initial investment costs but are also expensive to maintain, difficult to operate and which may cause "user trauma" during periods of cold weather because of a lack of confidence in the antifreeze protection devices. Accordingly, the goal of providing a simple, low-cost and low-maintenance solar water heating system which effectively solves the above problems and satisfies the demand for residential applications has not previously been fulfilled.

SUMMARY OF THE INVENTION

The objects and advantages of the invention will be set forth in part in the description which follows and in part will be obvious from the description, or may be learned by practice of the invention. Additional objects and advantages of the invention may be realized and attained by means of the instrumentalities and combinations particularly pointed out in the specification and the appended claims. Additionally, the teachings of the above-cited U.S. patents are incorporated herein by reference.

To achieve the foregoing objects and in accordance with the purpose of the invention, as embodied and broadly described herein, there is disclosed a solar water heating system comprising:

a solar energy collector comprising solar energy absorbing means communicating with a fluid distribution manifold;

a fluid pump operatively associated with a differential controller having temperature sensing means for measuring the temperature of said solar energy absorbing means and a water storage tank;

a fluid drainback tank communicating with said fluid distribution manifold for collecting drainage fluid from said fluid distribution manifold and communicating with said fluid pump; and a heat exchanger operatively associated with said water storage tank, said heat exchanger communicating with said pump;

wherein said fluid distribution manifold is positioned at an angle relative to a horizontal plane to allow for self-drainage when the pump is inactivated and comprises:

a fluid conduit means;

valve means disposed in said fluid conduit means;

said valve means separating a heat extracted fluid conduit portion and a heated fluid conduit portion in said fluid conduit means;

said heat extracted fluid conduit portion having a heat extracted fluid inlet means communicating with said heat exchanger and a heat extracted fluid outlet means communicating with said solar energy collector;

said heated fluid conduit portion having a heated fluid inlet means communicating with said solar energy collector and a heated fluid outlet means communicating with said fluid drainback tank; and said valve means sealing said heat extracted fluid conduit portion from said heated fluid conduit portion during operation of said pump.

There is also disclosed a novel solar energy collector comprising a flat housing having a clear cover, a bottom insulation layer, and a solar energy absorbing means communicating with a fluid distribution manifold for supplying and draining fluid from the solar energy absorbing means placed on top of the insulation layer, wherein the fluid distribution manifold comprises:

a fluid conduit; and valve means disposed in the fluid conduit;

the fluid conduit comprising a heat extracted fluid conduit portion and a heated fluid conduit portion when the valve means is closed;

the heat extracted fluid conduit portion having a heat extracted fluid inlet means and a heat extracted fluid outlet means communicating with the solar energy collector;

the heated fluid conduit portion having a heated fluid inlet means communicating with the solar energy collector and a heated fluid outlet means.

There is also disclosed a novel fluid distribution manifold for supplying and draining fluid from a solar energy absorbing means comprising:

a fluid conduit; and valve means disposed in the fluid conduit;

the fluid conduit comprising a heat extracted fluid conduit portion and a heated fluid conduit portion when the valve means is closed;

the heat extracted fluid conduit portion having a heat extracted fluid inlet means and a heat extracted fluid outlet means; and the heated fluid conduit portion having a heated fluid inlet means and a heated fluid outlet means.

It is to be understood that both the foregoing general description and the following detailed description are exemplary and explanatory only and are not restrictive of the invention as claimed.

The accompanying drawings, which are incorporated in and constitute a part of this specification, illustrate one embodiment of the invention and together with the description, serve to explain the principles of the invention.

DESCRIPTION OF THE PREFERRED EMBODIMENTS

Reference will now be made in detail to a preferred embodiment of the invention, an example of which is illustrated in the accompanying drawings. Wherever possible, the same reference numbers will be used throughout the drawings to refer to the same or like parts."

Figure 1:
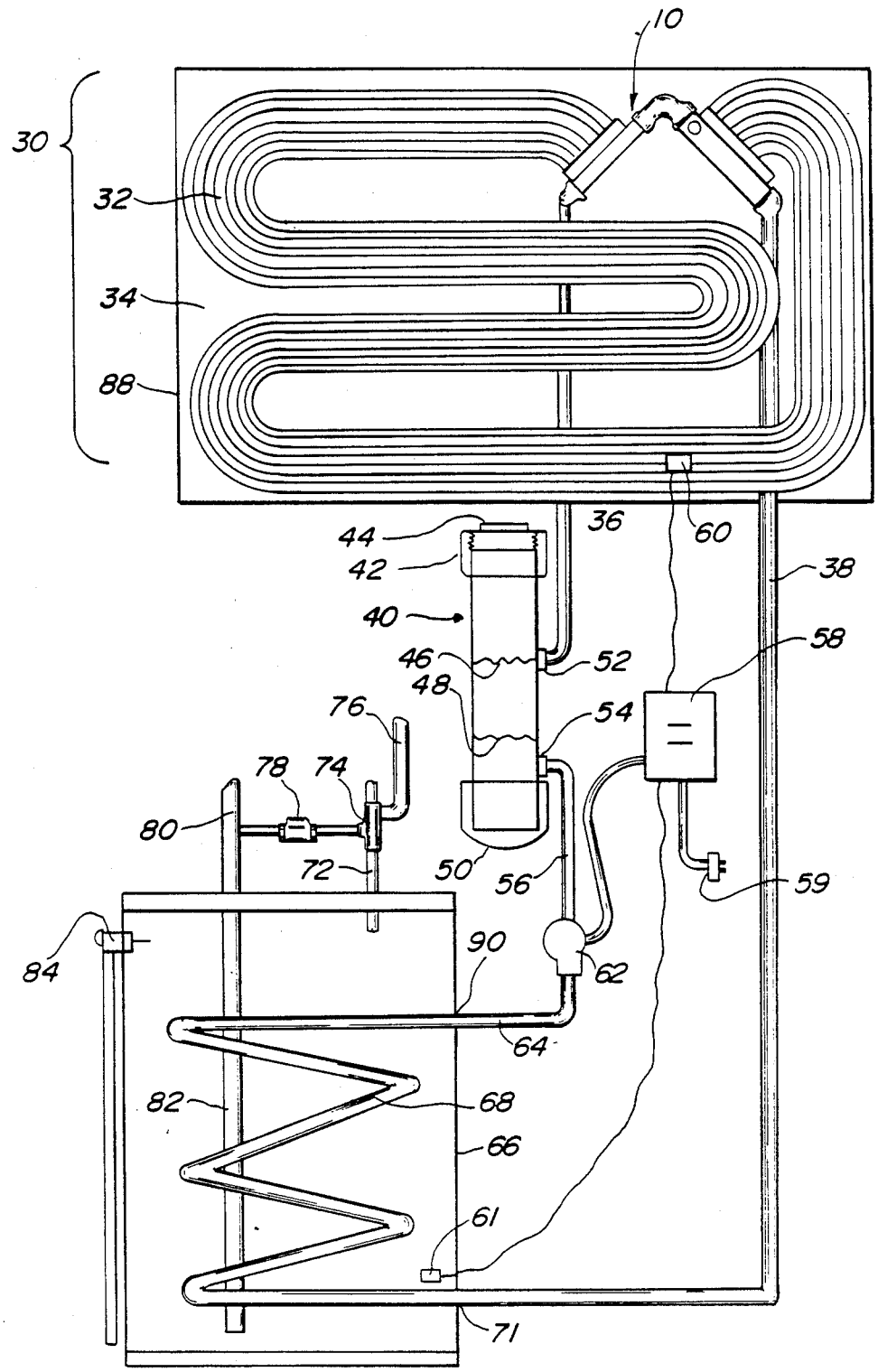
FIG. 1 is a schematic diagram illustrating an embodiment of the solar water heating system of the present invention.
Figure 2:
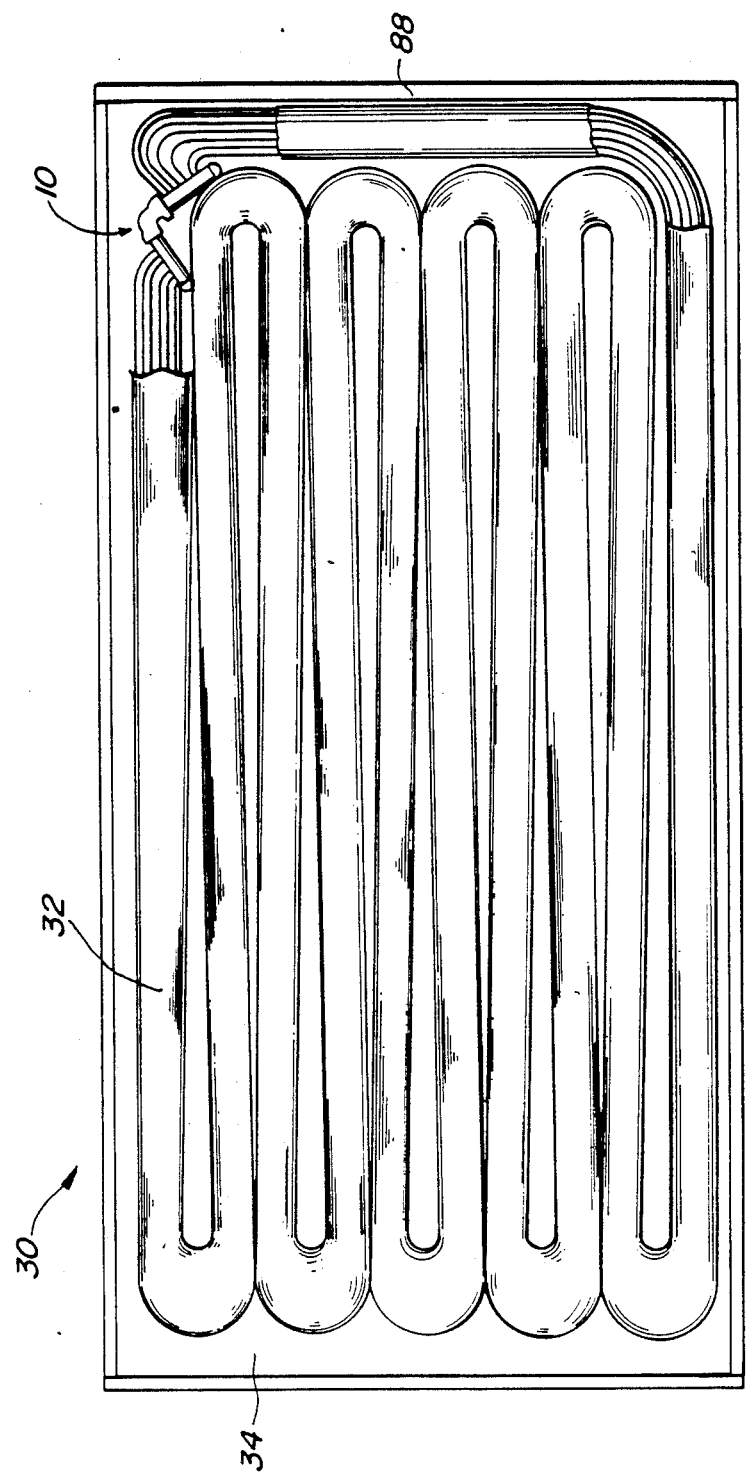
FIG. 2 is a schematic diagram illustrating an embodiment of the solar collector of the present invention.
Figure 3:
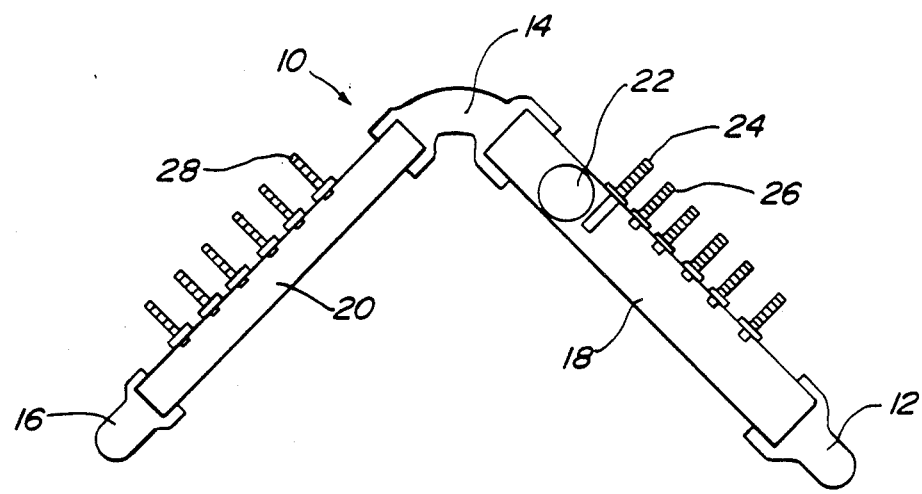
FIG. 3 is sectional view of the fluid distribution manifold of the solar collector illustrated in FIG. 2.
Figure 4:
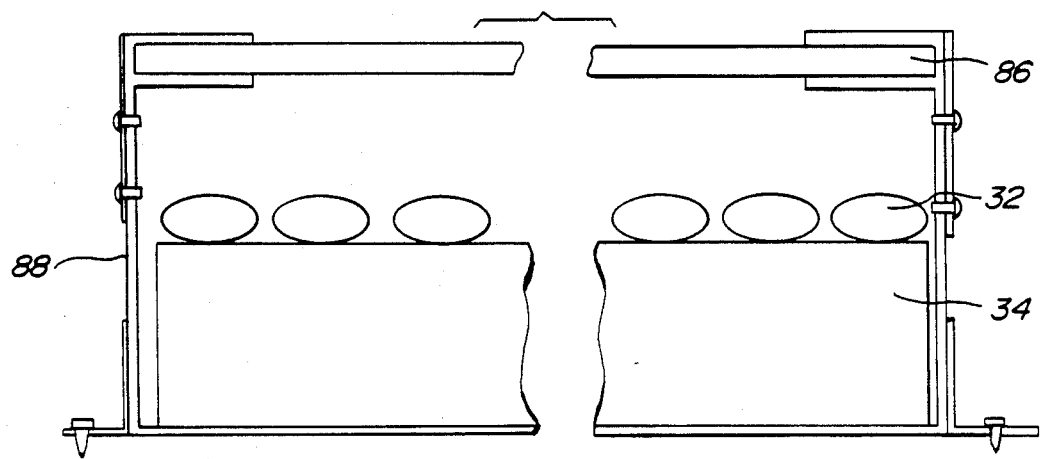
FIG. 4 is a sectional view of the solar collector illustrated in FIG. 2 taken along line 4—4.

Referring to FIG. 1, the solar water heating system of the present invention is illustrated in schematic form.

The solar energy collector 30 comprises a solar energy absorbing means 32 and a fluid distribution manifold 10 contained in a housing 88. The solar energy collector 30 may be mounted on the roof of a house or placed on its own support structure. However, it is important to mount the solar energy collector 30 on a plane which is at an angle relative to a horizontal plane because the fluid distribution manifold 10 must be positioned so as to be self-draining when there is no circulation.

The fluid distribution manifold 10 comprises a heated fluid inlet means connected to the outlet of the solar energy absorbing means 32, a heated fluid outlet means connected to a solar energy collector fluid return line 36, a heat extracted fluid inlet means connected to a solar energy collector fluid feed line 38, and a heat extracted fluid outlet means connected to the inlet of the solar energy absorbing means. The solar energy collector fluid return line 36 is connected by connector 52 to a drainback tank 40. The drainback tank 40 is connected by a pump feed line 56 to a fluid pump 62. The pump 62 is connected to a heat exchanger 68 by heat exchanger feed line 64. The heat exchanger feed line is introduced into a water storage tank 66 by an inlet port 70. The heat exchanger 68 is located within and operatively associated with the water storage tank 66. The heat exchanger 68 is connected to the solar energy collector 30 through an outlet port 71 by a solar energy collector feed line 38. The solar energy collector feed line 38 is connected to the fluid distribution manifold 10 of the solar energy collector 30.

The fluid pump 62 is activated and controlled by a differential controller 58. An electrical plug 59 provides power for the differential controller 58. A temperature sensing means 60, e.g., electronic temperature sensor, is provided underneath the solar energy absorbing means 32 and is connected to the differential controller 58. Another temperature sensing means 61 is provided inside and near the bottom of the water storage tank 66. The differential controller receives temperature reading signals from the temperature sensing means 60 and 61. So long as the temperature reading from the temperature sensing means 60 underneath the solar energy absorbing means is higher than a variable critical temperature, i.e., the temperature reading from the temperature sensing means 61 inside the water storage tank 66 plus a predetermined number of degrees, e.g., 3° F., the differential controller continues to activate the pump 62. In the event the temperature reading from temperature sensing means 60 falls below the variable critical temperature, the differential controller 58 shuts off the pump 62. Once the differential controller 58 shuts off the pump 62, the differential controller 58 will not activate the pump 62 until the temperature reading from temperature sensing means 60 is higher then a variable critical temperature, i.e., the temperature reading from the temperature sensing means 61 inside the water storage tank 66 plus a predetermined number of degrees, e.g., 7° F. This ensures that the pump 62 is not activated when the water inside of the solar energy absorbing means 32 is frozen or when the temperature of sensor 60 is lower than a variable critical temperature.

As embodied herein, the energy absorbing means 32 comprises a EPDM rubber mat having a plurality of fluid conduits running throughout the length of the rubber mat. EPDM rubber is a preferred material for making the energy absorbing means since it is flexible and can withstand freezing temperature conditions and a relatively high degree of heat without losing its physical integrity. However, other suitable materials may be used in constructing the energy absorbing means. As embodied herein, the length of the rubber mat may be between 80 to 120 feet in length, and there are six fluid conduits running through the length of the rubber mat. Accordingly, there are approximately 480 to 720 feet of total fluid conduit length. Because the rubber mat is flexible, it can easily be placed in the housing 88 by folding the rubber mat in an alternating, zig-zag fashion to any size or shape desired as long as the mat is predominantly below the level of the fluid distribution manifold.

The fluid distribution manifold 10 as embodied herein may be made from brass or copper or other suitable materials. The fluid distribution manifold 10 as embodied herein comprises two pipes 18 and 20 joined by an ell 14 so as to form one fluid channel. One pipe 18, however, constitutes the heat extracted fluid conduit portion of the fluid distribution manifold 10. The other pipe 20 constitutes the heated fluid conduit portion of the fluid distribution manifold 10. It is important to note that in the instance where a floating valve is used, the manifold 10 must be at a certain minimum angle relative to a horizontal plane in order to allow the floating ball valve 22 to fall and rest against the elongated barb 24 or other suitable stop means. The angling of the manifold 10 relative to a horizontal plane is also important from the standpoint that the manifold 10 must be selfdraining by action of gravity on the fluid when the pump 62 is deactivated by the differential controller 58. Usually, the angle of the roof of a house is sufficient to provide the requisite degree of angle.

The heat extracted fluid conduit portion 18 has a heat extracted fluid outlet comprising a plurality of brass barbs 24, 26 braised thereon. The elongated heat extracted fluid outlet connector 24 stops the floating ball valve 22 from falling too far down the heat extracted conduit portion 18. Heat extracted fluid is introduced into the heat extracted fluid conduit portion 18 by way of the solar energy collector feed line 38 which is connected to the heat extracted fluid inlet ell 12 of the fluid distribution manifold 10.

The heated fluid conduit portion 20 has a heated fluid outlet comprising a plurality of brass barbs 28 braised thereon. Heated fluid is introduced into the heated conduit portion 18 by way of the solar energy collector 30 which is connected to the plurality of brass barbs 28 of the fluid distribution manifold 10.

In accordance with the invention, the valve means 22 is a floating valve which as embodied herein comprises a floating ball valve. The floating ball valve 22 may be made from any suitable material which floats and is relatively inert. In the present embodiment, the floating ball valve 22 is made using polypropylene.

The valve means 22 of the present invention allows air or gas to pass from the drainback tank 40 through the feed line 36 when the pump 62 is stopped by the differential controller 58 to allow complete drainage of fluid from the fluid distribution manifold 10. When the pump 62 is made to operate or started, the valve means 22 of the present invention allows air to pass from within the heat extracted conduit portion 18 of the fluid distribution manifold 10 through the length of the fluid distribution manifold 10 and out to the drainback tank 40 through the feed line 36 and thus avoids introduction of air or gas into the solar energy absorbing mat which could otherwise cause inefficient operation. Only when liquid such as water enters the heat extracted fluid conduit portion 18 by action of the pump 62 does the floating ball valve 22 rise through the heat extracted fluid conduit portion 18 until it meets the joint with the ell 14 and effectively seals the heat extracted fluid conduit portion 18 from the heated fluid conduit portion 20 to force the liquid such as water through the heat extracted fluid outlet connector and into the solar energy absorbing mat. Other valves such as check valves and those disclosed in, for example, U.S. Pat. No. 4,381,816 may be used instead of the floating ball valve.

The fluid pump 62 as embodied in the present invention may be a small pump electrically controlled by the differential controller 58. The power of the fluid pump 62, however, must be able to create a head sufficient to drive the fluid, e.g., water, through the solar energy collecting mat.

The drainback tank 40 as disclosed and embodied herein is a non-pressurizing fluid drainback tank made of PVC and comprises a 6 inch diameter top cap 44 and attachment ring 42, approximately 30 inches of 6 inch diameter PVC cylinder and a slip cap 50 sealing the bottom of the PVC cylinder. The top cap 44 is preferably threaded for easy filling and checking of the water level inside the fluid drainback tank 40.

The heat exchanger 68 may be a conventional heat exchanger or a small diameter heat exchanger which is inserted in the water storage tank 66.

The operation of the solar water heating system of the present invention will now be described with reference to the figure drawings.

Water is stored in the fluid drainback tank 40 at level 46, which is equal to or slightly below the level where the solar energy collector return line 36 is connected to the fluid drainback tank 40 by line attachment connector 52. A certain amount of empty tank area above line attachment connector 52 is provided in the drainback tank 40 in the event stagnent conditions cause water in the solar energy collector 30 to boil out and condense in the fluid drainback tank 40. Much of the excess water will then be sucked back into the solar energy collector 30.

The water in the fluid drainback tank 40 is pulled out through pump feedline 56 by the pump 62 when the differential controller 58 senses a temperature reading from sensor 60 which is approximately 7° F. higher than the temperature reading from the sensor 61.

The fluid pump 62 pulls water from the fluid drainback tank 40 and pushes the water through the heat exchanger feedline 64, through the heat exchanger 68, and out of the water storage tank 66. The heat exchanger feedline 64 and the solar energy collector feedline 38 are introduced to the water storage tank 66 by special inlet and outlet adaptors 70 and 71, respectively.

The water storage tank 66 comprises standard features such as pressure relief valve 84, hot water tempering valve 74 and check valve 78 to prevent intra tank reverse thermo-syphoning of hot water 76 which reduces efficiency as well as a standard cold water 80 dip tube 82.

After the water is pushed through the heat exchanger 68, it is pushed through the solar energy collector feedline 38 to the fluid distribution manifold 10 through a copper ell 12 and into a copper tube 18 which has five brass barbs 26 braised to it and one elongated brass barb 24 braised to it to stop the polypropylene ball valve 22 from falling too far down the tube 18. The two tubes comprising the heat extracted fluid conduit portion 18 and the heated fluid conduit portion 20 are slanted at about a 45° angle to allow for self-drainage as well as efficient use of space in the solar energy collector 30.

When the pump is activated the water in the solar energy collector feedline 38 is preceeded by air which is pushed by the advancing liquid past the flotating ball valve 22 through the heated fluid conduit portion 20 and out through the ell 16 and into the drainback tank 40 where the air replaces the receding water level. As water enters the heat extracted fluid conduit portion, the floating ball valve begins to rise and eventually seals the heat extracted fluid conduit portion 18 from the heated fluid conduit portion 20. The water is therefore forced to exit through the barb connectors 24, 26 and into the solar energy absorbing means 32. A flow rate of approximately one gallon of water per minute through the looped solar water heating system provides adequate performance levels. As the water travels through the solar energy collector fluid passageways, the water becomes heated and eventually enters the heated fluid conduit portion 20 of the fluid distribution manifold 10 through six barb connectors 28. The heated water is returned to the drainback tank 40 through ell 16 and solar energy collector return line 36. When water is passing to the drainback tank, the water level in the drainback tank 40 will have dropped to its lowest operating level 48. This circulation pattern continues so long as solar radiation causes the solar tube mat 32 to be at least to 3° F. or more than the temperature at the bottom of the water storage tank 66.

It will be apparent to those skilled in the art that various modifications and variations can be made in the solar water heating system and related manifold system of the present invention and in constructing this solar water heating system and related manifold system without departing from the scope or spirit of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A solar water heating system comprising:
    a solar energy collector comprising solar energy absorbing means communicating with a fluid distribution manifold;
    a fluid pump operatively associated with a differential controller having temperature sensing means for measuring the temperature of said solar energy absorbing means and a water storage tank;
    a fluid drainback tank communicating with said fluid distribution manifold for collecting drainage fluid from said fluid distribution manifold and communicating with said fluid pump; and
    a heat exchanger operatively associated with said water storage tank, said heat exchanger communicating with said pump;
    wherein said fluid distribution manifold is positioned at an angle relative to a horizontal plane to allow for self-drainage when the pump is inactivated and comprises:
    a fluid conduit means;
    valve means disposed in said fluid conduit means;
    said valve means separating a heat extracted fluid conduit portion and a heated fluid conduit portion in said fluid conduit means;
    said heat extracted fluid conduit portion having a heat extracted fluid inlet means communicating with said heat exchanger and a heat extracted fluid outlet means communicating with said solar energy collector;
    said heated fluid conduit portion having a heated fluid inlet means communicating with said solar energy collector and a heated fluid outlet means communicating with said fluid drainback tank; and
    said valve means sealing said heat extracted fluid conduit portion from said heated fluid conduit portion during operation of said pump.

2. The solar water heating system as claimed in claim 1 wherein said valve means is a floating ball valve.

3. The solar water heating system as claimed in claim 1 wherein said valve means is a check valve.

4. The solar water heating system as claimed in claim 1 wherein said solar energy absorbing means comprises an EPDM rubber mat having a plurality of liquid passageways running throughout the length thereof.

5. A solar energy collector comprising a flat housing having a clear cover, a bottom insulation layer, and a solar energy absorbing means communicating with a fluid distribution manifold for supplying and draining fluid from the solar energy absorbing means placed on top of the insulation layer, wherein the fluid distribution manifold comprises:
    a fluid conduit; and
    valve means disposed in the fluid conduit, said valve means being actuated from an open position to a closed position by fluid contacting therewith;
    said fluid conduit comprising a heat extracted fluid conduit portion and a heated fluid conduit portion when said valve means is in the closed position;
    said heat extracted fluid conduit portion having a heat extracted fluid inlet means and a heat extracted fluid outlet means communicating with said solar energy absorbing means;
    said heated fluid conduit portion having a heated fluid inlet means communicating with said solar energy absorbing means and a heated fluid outlet means; and
    said fluid conduit forming a single, continuous channel when said valve means is in the open position.

6. The solar energy collector as claimed in claim 5 wherein said valve means is a floating ball valve.

7. The solar energy collector as claimed in claim 5 wherein said valve means is a check valve.

8. The solar energy collector as claimed in claim 5 wherein said solar energy absorbing means comprises an EPDM rubber mat having a plurality of fluid passageways running throughout the length thereof.

9. A fluid distribution manifold for supplying and draining fluid from a solar energy absorbing means comprising:
    a fluid conduit; and
    valve means disposed in said fluid conduit, said valve means being actuated from an open position to a closed position by fluid contacting therewith;
    said fluid conduit comprising a heat extracted fluid conduit portion and a heated fluid conduit portion when said valve means is in the closed position;
    said heat extracted fluid conduit portion having a heat extracted fluid inlet means and a heat extracted fluid outlet means;
    said heated fluid conduit portion having a heated fluid inlet means and a heated fluid outlet means; and
    said fluid conduit forming a single, continuous channel when said valve means is in the open position.

10. The fluid distribution manifold as claimed in claim 9 wherein said valve means is a floating ball valve.

11. The fluid distribution manifold as claimed in claim 9 wherein said valve means is a check valve.

12. A solar water heating system comprising:
    a solar energy collector comprising solar energy absorbing means communicating with a fluid distribution manifold;
    a fluid pump operatively associated with a differential controller having temperature sensing means for measuring the temperature of said solar energy absorbing means and a water storage tank;
    a fluid drainback tank communicating with said fluid distribution manifold for collecting drainage fluid from said fluid distribution manifold and communicating with said fluid pump; and
    a heat exchanger operatively associated with said water storage tank, said heat exchanger communicating with said pump;
    wherein said fluid distribution manifold comprises:

a central fluid passageway comprising a heat extracted fluid passageway and a heated fluid passageway;

said heat extracted fluid passageway having a heat extracted fluid inlet means communicating with said heat exchanger and a heat extracted fluid outlet means communicating with said solar energy collector;

said heated fluid passageway having a heated fluid inlet means communicating with said solar energy collector and a heated fluid outlet means communicating with said drainback tank; and valve means between said heat extracted fluid passageway and said heated fluid passageway for sealing said heat extracted fluid passageway from said heated fluid passageway during operation of said pump.

13. The solar water heating system as claimed in claim 12 wherein said valve means is a floating ball valve.

14. The solar water heating system as claimed in claim 12 wherein said valve means is a check valve.

15. The solar water heating system as claimed in claim 10 wherein said solar energy absorbing means comprises an EPDM rubber mat having a plurality of fluid passageways running throughout the length thereof.

* * * * *